UNITED STATES PATENT OFFICE.

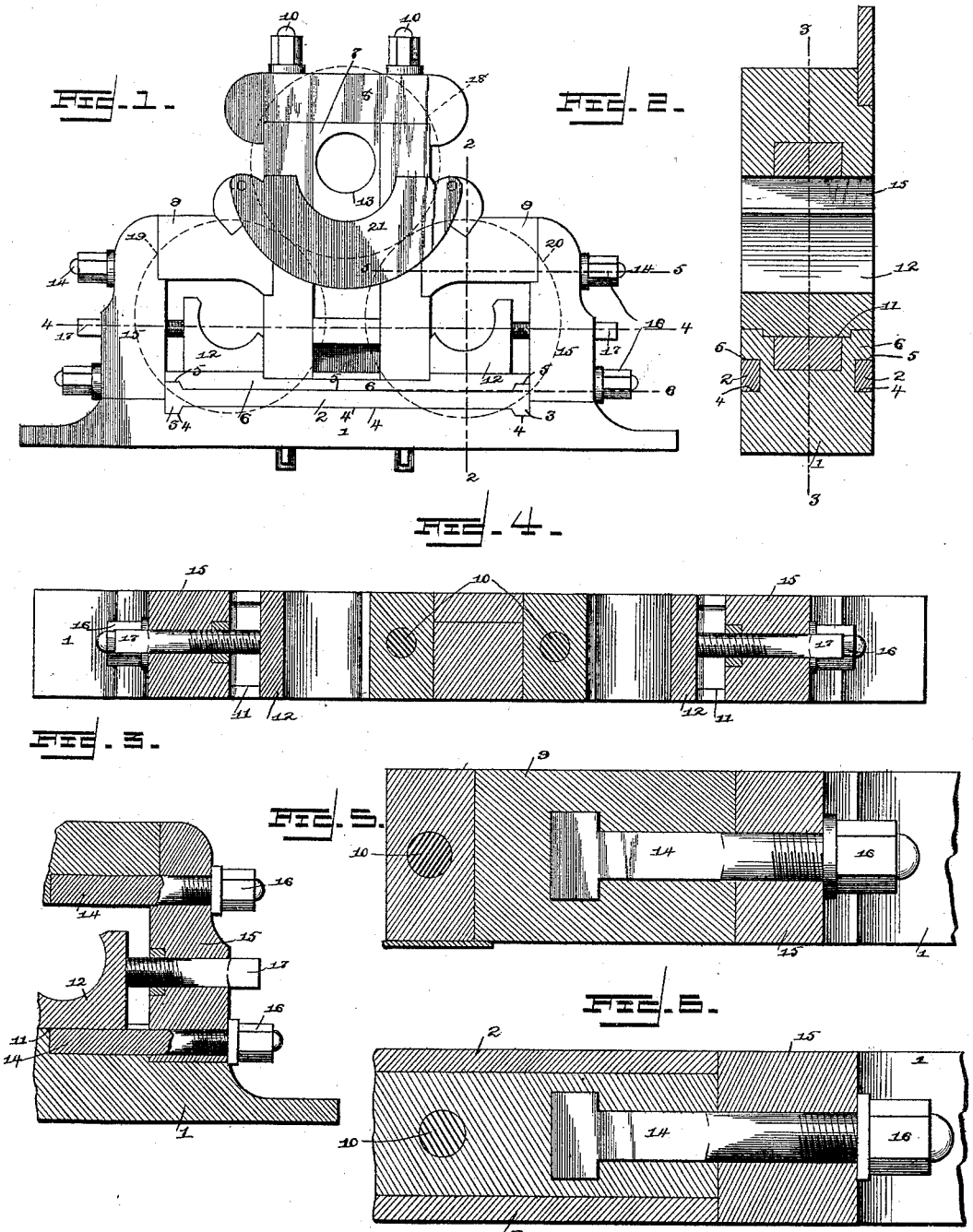

GEORGE SIMON, OF NEW IBERIA, LOUISIANA.

HOUSING FOR CANE-MILLS.

SPECIFICATION forming part of Letters Patent No. 462,169, dated October 27, 1891.

Application filed May 13, 1891. Serial No. 392,568. (No model.)

*To all whom it may concern:*

Be it known that I, GEORGE SIMON, a citizen of the United States, residing at New Iberia, in the parish of Iberia and State of Louisiana, have invented a new and useful Housing for Cane-Mills, of which the following is a specification.

This invention relates to cane-mills; and it has for its object to provide an improved housing for the shafts of the crushing-rolls which shall be exceedingly simple in construction, durable, capable of resisting great strain, and which shall be furthermore so arranged that in the event of breakage repairs may easily and quickly be made.

A further object of the invention is to so construct the housing as to prevent cane and bagasse from working between the rollers and the housing and sticking there, thus interfering with the operation.

With these ends in view the invention consists in the improved construction, arrangement, and combination of parts, which will be hereinafter fully described, and particularly pointed out in the claims.

In the drawings hereto annexed, Figure 1 is a side elevation of a housing constructed in accordance with my invention. Fig. 2 is a vertical sectional view taken on the line 2 2 in Fig. 1. Fig. 3 is a vertical sectional view of one end of the housing taken on the line 3 3 in Fig. 2. Fig. 4 is a horizontal sectional view taken on the line 4 4 in Fig. 1. Fig. 5 is a horizontal sectional view taken on the line 5 5 in Fig. 1. Fig. 6 is a horizontal sectional view taken on the line 6 6 in Fig. 1.

Like numerals of reference indicate like parts in all the figures.

My improved cane-mill housing is made principally of cast-iron and is composed of several separate pieces suitably bolted together and connected, as I shall now proceed to describe.

1 designates a sill or base, upon which are placed wrought-iron straps 2, having T-heads 3 3, which are fitted in suitable recesses 4 and 5 in the sill 1 and in the under side of a foot-plate 6, which is placed above the straps 2, which latter are shrunk into place between the sill and the foot-plate. The foot-plate supports the center frame 7, having the cap-piece 8 and the laterally-extending arms 9 9. Bolts 10 extend vertically through and serve to connect the cap-piece 8, the center frame 7, the foot-plate 6, the strap 2, and the sill or base 1. The foot-plate is provided at its ends with grooves 11, to afford bearings for the sliding blocks or boxes 12, in which the shafts of the lower rolls are to be mounted. A bearing 13 for the shaft of the upper roll is provided in the center frame 7, near the upper end of the latter.

The under sides of the laterally-extending arms 9 and the upper side of the foot-plate 6 at each end of the latter are provided with recesses to accommodate the T-headed bolts 14, which extend through the slide-blocks 15, which latter are mounted upon the ends of the sill and are capable of being drawn up against the ends of the arms 9 and of the foot-plate by tightening the nuts 16 upon the said bolts. The blocks 15 have set-screws 17, adapted to bear against the outer sides of the sliding blocks or boxes 12, enabling the latter to be forced in an inward direction, and thus enabling the lower rolls to be adjusted with relation to the upper rolls, as will be readily understood by reference to the drawings, where the said rolls are indicated in dotted lines, the upper roll being designated 18 and the lower ones by 19 and 20.

While in the drawings hereto annexed I have shown only a single housing, it will be of course understood that two such housings will be required to make up the frame of a cane-mill. Each housing is to be provided on its inner side with a curved plate 21 of steel, against which the ends of the several rolls abut and which serves to prevent the cane and bagasse from getting between the rolls and the housing. By this construction I am enabled to dispense with the flanges usually formed upon the crushing-rolls, and the latter may be extended up closer toward the housing than would otherwise be the case.

The operation and advantages of this invention will be readily understood.

My improved housing is simple in construction, compact, and durable, and owing to the wrought-iron strap shrunk in the base of the housing, it will be found capable of resisting any reasonable strain to which it may be subjected. In case of overfeeding, one of the T-headed bolts connecting the blocks 15 with the body of the housing will be likely to yield before anything else, thus saving breakage of the more important and expensive parts, which could not be readily replaced, while any one of the T-headed bolts may be replaced in a few minutes' time and at a trifling expense.

The general construction of the housing is simple and convenient, and the lower rolls, owing to the adjustable boxes in which they are mounted, may be very easily and quickly adjusted with relation to the upper roll.

Having thus described my invention, what I claim is—

1. In a housing for cane-mills, the combination of the sill and the foot-plate provided with recesses in their meeting faces, and the T-headed wrought-iron straps shrunk to position between said sill and foot-plate, substantially as set forth.

2. The combination of the sill, the foot-plate, the interposed T-headed wrought-iron straps, the center frame mounted upon the foot-plate and having a bearing for the shaft of the upper roll, the arms extending laterally from said center frame, the T-headed bolts mounted in recesses in the under sides of said arms and in the upper side of the foot-plate, the blocks resting upon the sill and having perforations for the passage of said bolts, the set-screw mounted in said blocks, and the boxes mounted slidingly upon the foot-plate and actuated by said set-screws, substantially as set forth.

3. The combination of the sill, the foot-plate, the interposed wrought-iron straps, the center frame having laterally-extending arms and the detachable end blocks having set-screws mounted therein, with the boxes mounted upon the foot-plate between the center frame and the detachable blocks, substantially as and for the purpose set forth.

4. In a device of the class described, the combination, with the foot-plate having longitudinal grooves or recesses in its upper side, of the boxes mounted slidingly in said grooves or recesses, the center frame having laterally-extending arms, the T-headed bolts, and the detachable blocks having set-screws adapted to bear against the sliding boxes, substantially as and for the purpose set forth.

In testimony that I claim the foregoing as my own I have hereto affixed my signature in presence of two witnesses.

GEORGE SIMON.

Witnesses:
   FRED GATES,
   LEOPOLD LEVY.